United States Patent Office 2,810,597
Patented Oct. 22, 1957

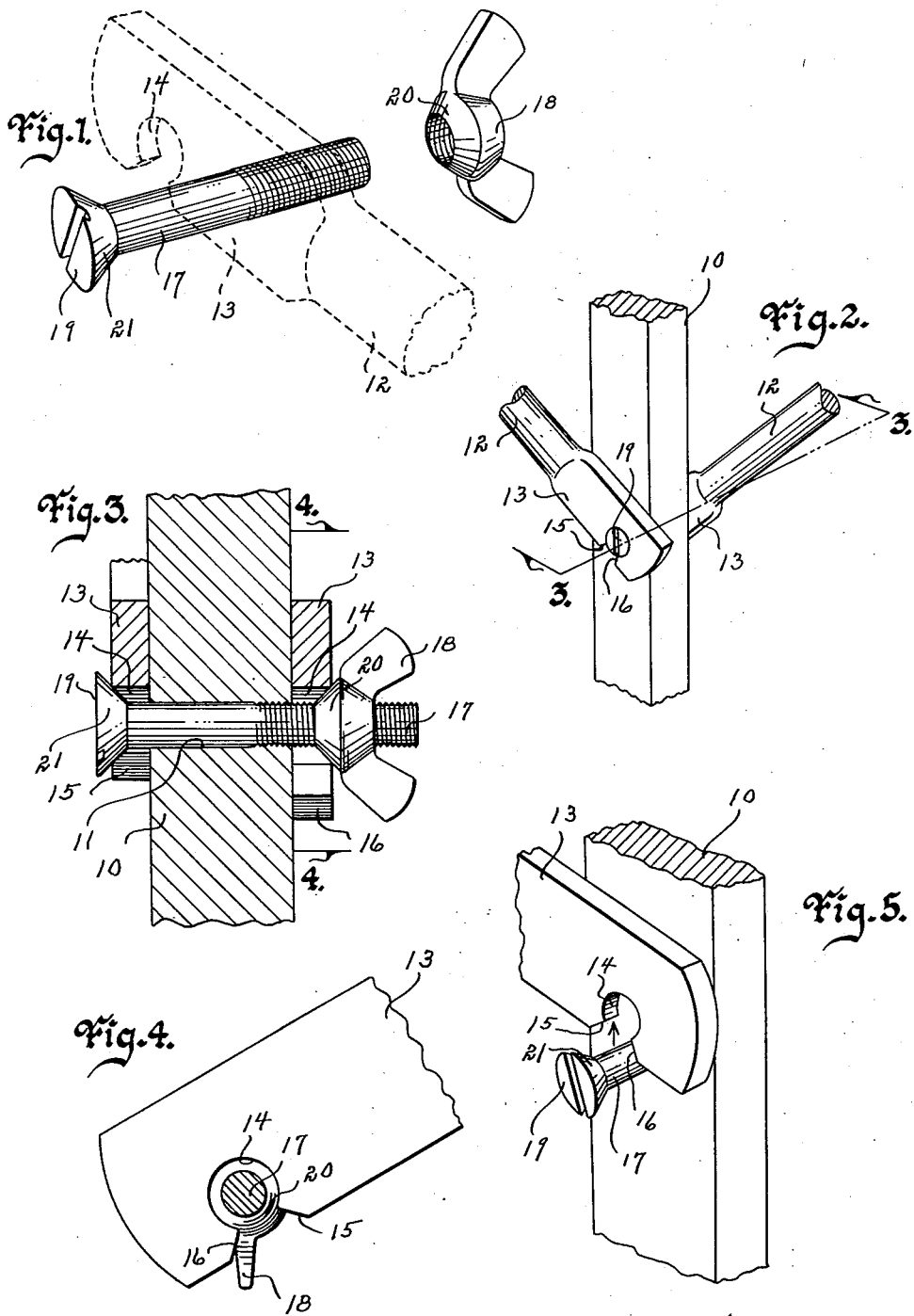

2,810,597
FASTENING DEVICE
Ambrose W. Poss, Des Moines, Iowa

Application October 5, 1953, Serial No. 384,199

5 Claims. (Cl. 287—103)

This invention relates to a means for quickly securing slotted or like arms, braces, and like to support members.

While my invention is particularly adapted for use in structural work such as scaffolding it may be employed wherever it is desired to temporarily rigidly secure two members together. In scaffolding installation, the brace or arm members are detachably secured to the supporting member by bolts. While safe and effective, the nuts of the bolts must be completely removed both at time of assembly and time of dismantling. This is a loss in time, labor and cost. Also, both bolts and nuts are dropped or lost.

Therefore, the principal object of my invention is to provide a fastening method and means that is easily and quickly actuated and without possible loss of the tightening nut nor its bolt.

A further object of my invention is to provide a brace fastening device that is positive and self centering.

Still further objects of this invention are to provide a construction fastening device that is economical in manufacture and durable in use.

These and other objects will be apparent to those skilled in the art.

My invention consists in the construction, arrangement and combination of the various parts of the device, whereby the objects contemplated are attained as hereinafter more fully set forth, specifically pointed out in my claims, and illustrated in the accompanying drawings, in which:

Fig. 1 is a perspective view of the bolt I use with a slotted arm therefor shown in broken lines, Fig. 2 is a perspective view of my fastening means in actual use, Fig. 3 is a cross-sectional view of the device taken on line 3—3 of Fig. 2, Fig. 4 is a sectional view of the device taken on line 4—4 of Fig. 3, and Fig. 5 is a perspective view of the device and more fully illustrating its construction and operation.

In these drawings I have used the numeral 10 to designate a supporting member having the usual holes 11 for receiving the brace attaching bolts. The numeral 12 designates an ordinary brace rod, arm or like having at least one end 13 flattened. This flattened end is adapted to rest adjacent the flat side of a supporting or like member 10. Through this flattened portion I drill or form a hole 14 and cut a notch in the side portion of this flat end to communicate with the hole 14. By this construction the notch forms the two shoulders 15 and 16 as shown in Fig. 4. These two shoulders extend inwardly to communicate with the hole 14 and by also extending inwardly and toward each other provide a tapering guide way for receiving the holding bolt. The width of this slot opening at its point of communication with the hole 14, is less than that of the diameter of the hole 14, but is only slightly greater than the diameter of the fastening bolt. The diameter of the shaft portion of the bolt, however, is substantially less than the diameter of the hole 14, as shown in Fig. 3. The slot and hole opening in the flattened end of the brace arm, may be, however, formed in any suitable manner, such as by stamping, casting or like. An arm or brace may have such a prepared flattened end portion at each end, or only one end, or the brace may be otherwise hinged or secured at one end and only its other end employing my invention. My bolt fastening means comprises a shaft portion 17, threaded at one end portion to take the wing nut portion 18, and a fixed head end portion 19. This bolt fastener may extend through a hole 11 and a member 10, and hold a brace at each side of the member 10 as shown in Fig. 3, or it may hold only one brace at one side of a member 10. The shaft portion 17 is much smaller in diameter than that of the diameter of the hole 14. The wing nut may be only a common nut, but is unique in that its inner base is in the form of a cone 20, extending inwardly into the hole 14. This convex portion 20 has its inner end smaller in diameter than that of the diameter of the hole 14, and its rear base end larger in diameter than that of the diameter of the hole 14. The head portion 19 may be in the form of a screw head, or bolt end, but I do show its structure as tapering inwardly to form a convex cone portion 21, and which is of the same structure and dimensions as the portion 20, except in use the portion 20, and portion 21 extend toward each other; i. e., toward the support 10.

The practical operation of my device is as follows:

With the bolt extending through a hole 11, and with the wing nut 18 threaded thereon, but in loose condition, a brace arm 12 is lowered onto the bolt shaft portion 17 until the shaft portion is within the hole 14. The shoulders 15 and 16 act as guides for this operation. If two braces are used on a single bolt means another brace arm on the other side of the member 10 is also so placed with its hole 14 embracing the bolt shaft. This operation is quick and easy inasmuch as the convex portion 21 of the bolt head and the convex portion 20 of the wing nut are loose thereto and not in effective hindering positions. However, merely by tightening the wing nut on the bolt shaft, the convex portion of the bolt head and the convex portion on the wing nut will enter and tightly engage the holes 14 in the two braces, respectively, as shown in Fig. 3. This action not only rigidly and tightly secures the brace or braces to another beam or like 10, but prevents the accidental removal of the bolt from within the confines of the hole or holes 14. The reason for this is that the convex portions 20 and 21 that are within the holes 14 respectively have at their contact planes with the holes 14, larger diameter than the width of the passageway slots leading to the holes 14. This, of course, is not true when the wing nut is loosened. Therefore, to remove a brace, it is merely necessary to loosen the wing nut so that the convex portion, where it contacts the hole 14, will be of a diameter slightly less than the width of the notch or passageway leading to the hole 14. Therefore, by such a structure, once the bolt is placed through a hole 11 and the nut placed thereon, it need never be removed to build up a scaffold or tear one down. In fact the wing nut, itself, never need be removed. When the wing nut is once tightened, however, the brace will be held in all directions, positively and tightly. Also two braces may be held together without the member 10, when desired.

Some changes may be made in the construction and arrangement of my fastening device without departing from the real spirit and purpose of my invention, and it is my intention to cover by my claims, any modified forms of structure or use of mechanical equivalents which may be reasonably included within their scope.

I claim:

1. A combination, a bar member having a hole of constant diameter and a slot opening communicating therewith, and having a width less than the diameter of said hole a bolt means normally extending through the hole in said bar member and adapted to also extend through one or more other members; said bolt means having a shaft portion of a diameter less than that of the width of the slot opening in said bar member, and a nut portion threaded on said shaft portion and having a convex cone on its base extending normally into the hole in said bar member and having its diameter greater than that of the diameter of said hole in said bar member.

2. A combination, a bar member having a hole of constant diameter and a tapered slot opening communicating therewith, and having a width less than the diameter of said hole, a bolt means normally extending through the hole in said bar member and adapted to also extend through one or more other members; said bolt means having a shaft portion of a diameter less than that of the width of the slot opening in said bar member, and a nut portion threaded on said shaft portion and having a convex cone on its base extending normally into the hole in said bar member and having its diameter greater than that of the diameter of said hole in said bar member.

3. In combination, a bar member having a hole of constant diameter and a slot opening communicating therewith, and having a width less than the diameter of said hole, a bolt means normally extending through the hole in said bar member and adapted to also extend through one or more other members; said bolt means having a shaft portion of a diameter less than that of the width of the slot opening in said bar member, and a wing nut portion threaded on said shaft portion and having a convex cone on its base extending normally into the hole in said bar member and having its diameter greater than that of the diameter of said hole in said bar member.

4. A combination, a bar member having a hole of constant diameter and a slot opening communicating therewith, and having a width less than the diameter of said hole, a bolt means normally extending through the hole in said bar member and adapted to also extend through one or more other members; said bolt means having a shaft portion of a diameter less than that of the width of the slot opening in said bar member, a nut portion threaded on said shaft portion and having a convex cone on its base extending normally into the hole in said bar member and having its diameter greater than that of the diameter of said hole in said bar member, and an enlarged head fixed on the other end of said shaft portion having a convex cone portion extending toward the convex cone portion of said nut.

5. In combination, a bar member having a hole of constant diameter and a slot opening communicating therewith, and having a width less than the diameter of said hole, a bolt means normally extending through the hole in said bar member and adapted to also extend through one or more other members; said bolt means having a shaft portion of a diameter less than that of the width of the slot opening in said bar member, a nut portion threaded on said shaft portion and having a convex cone on its base extending normally into the hole in said bar member and having its diameter greater than that of the diameter of said hole in said bar member, and an enlarged head fixed on the other end of said shaft portion having a convex cone portion extending toward the convex cone portion of said nut and of the same dimensions.

References Cited in the file of this patent

UNITED STATES PATENTS

| | | |
|---|---|---|
| 314,783 | Beebe | Mar. 31, 1885 |
| 414,519 | Gladding | Nov. 5, 1889 |
| 823,292 | Robinson | June 12, 1906 |
| 844,143 | Kingsley | Feb. 12, 1907 |
| 1,204,552 | Ekholm | Nov. 14, 1916 |
| 2,371,801 | Chester et al. | Mar. 20, 1945 |
| 2,660,271 | Hupp | Nov. 24, 1953 |
| 2,670,932 | Westerfors | Mar. 2, 1954 |